United States Patent Office

Re. 25,558
Reissued Apr. 21, 1964

25,558

PYROPHORIC ALLOYS WITHOUT IRON

Walter Bungardt, Essen-Bredeney, Germany, assignor to Ronson Metals Corporation, Newark, N.J.

No Drawing. Original No. 2,978,322, dated Apr. 4, 1961, Ser. No. 712,307, Jan. 31, 1958. Application for reissue Mar. 20, 1963, Ser. No. 267,884
Claims priority, application Germany Feb. 8, 1957
2 Claims. (Cl. 75—152)

Matter enclosed in heavy brackets [ ] appears in the original patent but forms no part of this reissue specification; matter printed in italics indicates the additions made by reissue.

This invention refers to the manufacture of pyrophoric [mass] *material* in rod and like formation for use in connection with lighters, safety lamps and for other industrial purposes.

It is well known that alloys containing [cerium-misch metal] *cerium mischmetal* with zinc when cast, may be employed for pyrophoric purposes, for example, as flints in safety lamps to be operated by miners as well as in the mining industry. Alloys of this type were heretofore manufactured exclusively by casting.

[However, the operational manufacturing conditions and the finished flint rod thereby obtained did not comply with economical and practical requirements, so that all attempts to make use of aforesaid alloy failed.]

New attempts have shown that a most economical and safe process can be carried out by means of extrusion if ingots of alloys of the aforesaid type of predetermined composition are subjected to such special process. It has now been surprisingly found that very desirable practical requirements can be realized and fulfilled and that none of the heretofore encountered difficulties will occur, if alloys are selected which are composed of [cerium-misch metal] *cerium mischmetal* with additions of zinc of predetermined range from 5% up to 25% by weight of the total alloy and more specifically from 12% to 17% by weight.

It is therefore one of the primary objects of the invention to provide means affording the manufacture of flint rods and like shapes of pyrophoric material with improved sparking and other desirable properties [, thereby contributing to increased and varied technically useful alloys].

It is another object of the present invention to provide means conducive to an economical and continuous novel process for obtaining finished extruded flint shapes in conformity with the apparatus in which said flint shapes are employed.

It has been further found that considerable improvements of the pyrophoric properties of extruded flint rods are attained if in the above mentioned alloys which are substantially completely devoid of iron, additional elements are incorporated, such as copper, cadmium, antimony, bismuth and manganese, ranging within certain limits from .5% to 8% by weight and preferably between [2% to 6%] *about 0.5% to about 8%* by weight.

Furthermore, other additions such as magnesium, have been found to be of great advantage in making up the alloy for the ingot to be subjected to extrusion, the magnesium amounting to about .5% to 5% by weight, from which in particular dense spark formation will result.

It is therefore still another object of the present invention to provide means rendering the possibility of influencing crystal formation in the finished flint product, so that on the one hand, the pyrophoric metal will offer great resistance to corrosion and wear during normal use, while on the other hand, its sparking and pyrophoric effect will be considerably increased and may be controlled within a relatively large range.

The invention will be more fully and comprehensively understood from a consideration of the following detailed description with the understanding, that the improvement is capable of extended application and is not confined to the precise disclosure, suggested changes and modifications may be made herein which do not affect the spirit of the invention nor exceed the scope thereof as expressed in the appended claims.

The following examples demonstrate the mode and preferred compounds according to which the present invention may be carried into effect.

EXAMPLE I

An alloy containing about 16% by weight of zinc, about 2% by weight of cadmium and about 1.5% of copper, with the remainder [cerium-misch metal] *cerium mischmetal* of commercial purity, is melted and [made up] *cast* into ingots [cast at about 150° to 500° C.]. After cooling down such ingot may then be subjected to extrusion at a temperature ranging from 380° C. to 400° C. The extrusion pressure applied amounts to about 4,100 kg./cm.$^2$.

EXAMPLE II

An alloy containing about 14% of zinc, about 4% of cadmium, approximately 2% of manganese and about 1.5% by weight of copper, is obtained having as a remaining constituent [cerium-misch metal] *cerium mischmetal* of commercial purity. Such alloy is [converted] *cast* into [an] ingot *form* [at about 150° to 500° C.] and after cooling down may then be subjected to extrusion at an extrusion temperature of 380° to 400° C. with an applied extrusion pressure of about 4,200 kg./cm.$^2$.

EXAMPLE III

A mixture containing about 15% by weight of zinc, about 3% by weight of cadmium and about 2.5% by weight of magnesium, is alloyed with about 1.5% of copper, the remainder being [cerium-misch metal] *cerium mischmetal* of commercial purity. This alloy is cast [at a temperature ranging from between 150° C. and 500° C. to obtain ingots, which are allowed to cool down. The ingot is] *into ingots which are* then extruded at a temperature of about 380° to 400° C. with an extrusion pressure applied to the ingots and extrusion press die of about 4,800 kg./cm.$^2$.

EXAMPLE IV

An alloy is made up containing about 15% by weight of zinc, about 3% by weight of cadmium, about 2% by weight of antimony and 1.5% by weight [by] *of* copper, the remainder being [cerium-misch metal] *cerium mischmetal* of commercial purity. This alloy is cast into [suitably sized] ingots [at a temperature of 150° to 500° C. and after cooling down the ingot may then be] *which are then* subjected to extrusion at 380° to 400° C. at a pressure of about 4,400 kg. /cm.$^2$.

EXAMPLE V

An alloy is employed consisting of about 15% by weight of zinc, about 3% by weight of cadmium, about 2% by weight of bismuth with approximately 1.5% by weight of copper, the remainder being [cerium-misch metal] *cerium mischmetal* of commercial purity. The alloy is melted and then cast into ingots [at 150° to 500° C. and may thereafter be] *which are* extruded at 380° to 400° C. at an extrusion pressure of about 4,500 kg./cm.$^2$.

The aforesaid [cerium (misch metal)] *cerium mischmetal*-zinc alloys may contain between 14% and 16% by weight of zinc and between 2% and 4% by weight of cadmium, with the addition of [trace] amounts of copper of about 1.5% by weight.

[It ensues from the aforesaid examples that the extrusion pressure may be easily regulated by certain additions of manganese, preferably ranging between .5% to 8% by weight and preferably ranging from 2% to 6% by weight. A further increase of the extrusion pressure was obtainable through the addition of magnesium ranging between .5% to 5% by weight. A particularly useful alloy having an addition of magnesium of approximately 2.5% by weight requires a considerably increased extrusion pressure. Other additions to regulate the extrusion pressure may be additions of antimony of 2% by weight or bismuth of about 2% by weight, in the latter cases, the extrusion pressure being markedly reduced in comparison with the extrusion pressure obtained when magnesium was added to the basic constituents of cerium (misch metal)-zinc-cadmium-copper alloy.]

It has been found that the extrusion process may be advantageously carried out at a required extrusion pressure ranging from about 4,000 kg./cm.$^2$ to about less than 5,000 kg./cm.$^2$. To this end an ingot is produced by adding to [cerium (misch metal)] *cerium mischmetal* a zinc content ranging between 5% and 25% by weight with the additions of at least one of the elements selected from the group comprising copper, magnesium, cadmium, antimony, bismuth and manganese.

Although preferred embodiments of the invention have been described, it will be understood that modifications may be made within the spirit and scope of the appended claims. It will, however, be understood that there is no intention to include unmentioned ingredients other than minor impurities.

Having thus described the invention, what is claimed as new and desired to be secured by Letters Patent, is:

1. A pyrophoric mass suitable for extrusion to produce finished flints in rod formation; consisting essentially of [cerium (misch metal)] *cerium mischmetal* with zinc ranging from 5% to 25% by weight, and having an addition of at least one of the elements selected from the group consisting of copper, cadmium, antimony, bismuth and manganese, said addition ranging from [2% to 6%] *about 0.5% to about 8%* by weight, and a further addition of magnesium amounting to about .5% to 5% by weight [to adjust the extrusion pressure to at least 4,100 kg./cm.$^2$], the balance being cerium [(misch metal)] *mischmetal.*

2. A pyrophoric mass suitable for extrusion to produce finished flints in rod formation; consisting essentially of cerium [(misch metal)] *mischmetal* with zinc of about 14% by weight, and further additions of copper, manganese and cadmium, the amount of copper being about 1.5% by weight, that of manganese being about 2% by weight, and that of cadmium being about 4% by weight.

References Cited in the file of this patent or the original patent

UNITED STATES PATENTS

| | | |
|---|---|---|
| 1,102,575 | Faehr | July 7, 1914 |
| 1,118,138 | Kratky | Nov. 24, 1914 |

FOREIGN PATENTS

| | | |
|---|---|---|
| 15,507 | Great Britain | Oct. 27, 1910 |
| 3,350 | Great Britain | Nov. 14, 1912 |